Feb. 22, 1966    D. A. SOKOLOV    3,237,052
ELECTRIC DISCHARGE CIRCUIT
Filed Oct. 11, 1962    2 Sheets-Sheet 1

DAVID A. SOKOLOV
INVENTOR.

BY Cadwallader And Kelly

ATTORNEYS

Feb. 22, 1966  D. A. SOKOLOV  3,237,052
ELECTRIC DISCHARGE CIRCUIT
Filed Oct. 11, 1962  2 Sheets-Sheet 2

DAVID A. SOKOLOV
*INVENTOR.*

BY *Cadwallader And Kelly*

ATTORNEYS

United States Patent Office 3,237,052
Patented Feb. 22, 1966

3,237,052
ELECTRIC DISCHARGE CIRCUIT
David A. Sokolov, Swampscott, Mass., assignor to Edgerton, Germeshausen & Grier, Inc., Boston, Mass., a corporation of Massachusetts
Filed Oct. 11, 1962, Ser. No. 229,849
6 Claims. (Cl. 315—209)

The present invention relates to electric discharge circuits, and in particular to electric discharge circuits that are battery operated and self-timing.

In an electronic flash circuit a charging circuit charges a discharge capacitor up from an initial voltage to some higher voltage. A flash tube has two main electrodes and at least one trigger electrode and is filled with a gas such as xenon. The main electrodes are connected across the discharge capacitor. An energized trigger circuit delivers a trigger pulse to the trigger electrode causing ionization to occur in the gas between the trigger electrode and one of the main discharge electrodes of the flash tube. The gas between the main electrodes of the flash tube then breaks down and the discharge capacitor discharges across the main electrodes of the flash tube, producing a very brilliant flash of light. A triggered spark gap or similar discharge device may be substituted for the flash tube.

Various types of inverter circuits have heretofore been utilized with a diode to charge the load capacitor. The transistorized flyback inverter circuit, either regulated or unregulated, is one of the most efficient. However, as will become apparent hereinafter, the unregulated flyback inverter circuit is preferable for use in a self-timing electronic flash circuit.

Prior art trigger circuits include hydrogen thyratron circuits and silicon controlled rectifier circuits designed to permit, when energized, a charged capacitor to discharge through the primary winding of a trigger transformer. The pulse induced in the secondary winding is applied so as to cause ionization of the gas between the trigger electrode and one of the main electrodes of the flash tube. Self-timing electronic flash circuits in which these trigger circuits are incorporated require the use of some type of oscillator, or repetitive switching to trigger the flash tube, causing it to flash at a predetermined rate. An obvious disadvantage of such circuits is that a large number of electronic components must be utilized therein. Moreover, the reliability of such circuits decreases as the number of component parts increases.

It is, therefore, an object of the present invention to provide a self-timing electric discharge circuit, and in particular an electronic flash circuit, in which the number of component parts has been drastically reduced. A concomitant object is to provide such a circuit in which the reliability of operation has been considerably increased.

Another object of the invention is to provide a new and improved electronic flash circuit that shall be simple and rugged in construction, light in weight, portable and self-contained, easily operable, without moving parts, and thoroughly effective and reliable in operation.

A further object is to provide new and improved means for controlling the flashes of light, so that they may be started quickly and consistently and by means of a very small amount of electrical energy.

A further object is to provide a new and improved electronic flash circuit that shall operate reliably and at any time.

Still another object of the invention is to provide new and improved apparatus for producing substantially uniform electrical-energy flashes of the type in which a condenser is periodically discharged through a triggered discharge device.

Other and further objects will be explained hereinafter and will be particularly pointed out in the appended claims.

In summary, my invention comprises an unregulated transistorized flyback inverter having a core member comprising input, hold and output windings, with the further addition of a trigger winding, all windings thereon being disposed in inductive relationship. Circuit means connect the inverter through a diode to a discharge capacitor and an electric discharge device. The combination causes the capacitor to discharge through the discharge device at a rate dependent upon component values and environmental conditions.

The inventon will now be described in connection with the accompanying drawings, in which.

Figure 3A:
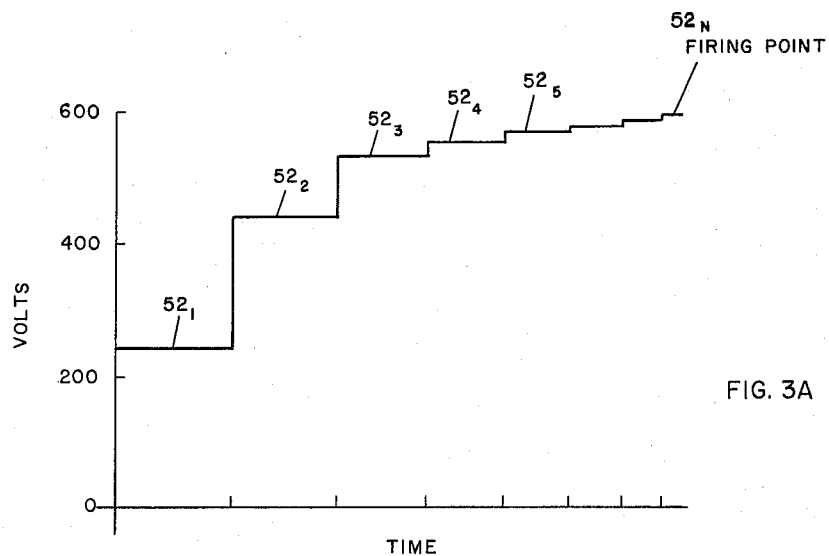
Figure 3B:
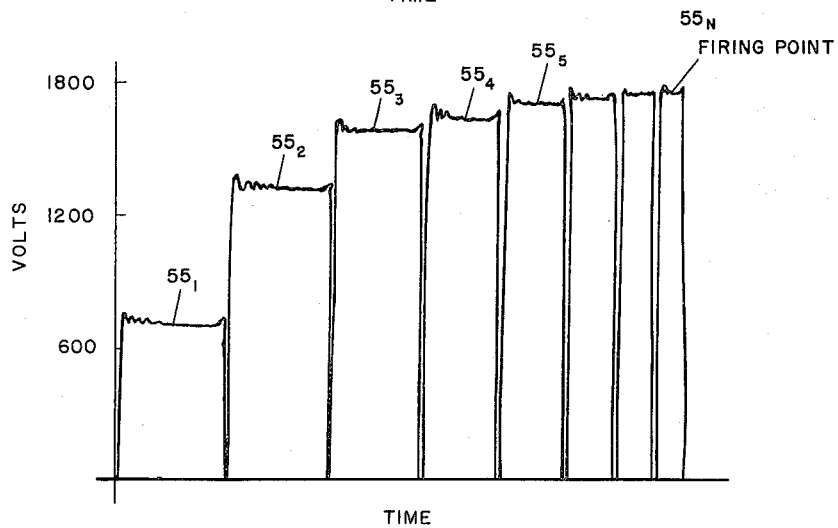

FIGURE 3A and 3B present a graph of capacitor charging voltages and a graph of trigger voltages, useful in explaining the operation of the invention.

Figure 1:
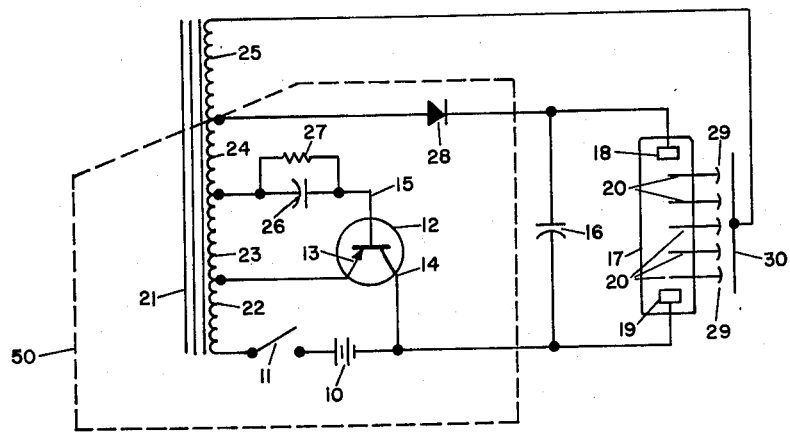
FIGURE 1 illustrates schematically the circuit of the present invention in a preferred embodiment.

FIGURE 1 illustrates the present invention utilized in connection with the combination of an unregulated flyback inverter and dioed, the combination being more precisely defined as converter 50 since it converts D.-C. to D.-C. The positive terminal of battery 10, or any suitable D.-C. power source, connects through switch 11 to one end of input winding 22 of autotransformer 21, all windings of which are disposed in inductive relationship thereto. The other end of input winding 22 connects to emitter 13 of PNP transistor 12. The negative terminal of battery 10 connects to collector 14 of PNP transistor 12. Emitter 13 also connects to one end of hold winding 23 of autotransformer 21. The other end of hold winding 23 connects to one plate of capacitor 26. The other plate of capacitor 26 connects to base 15 of PNP transistor 12. Resistor 27 connects in parallel with capacitor 26, as illustrated. Note that one end of input winding 22 connects in common to emitter 13 and to one end of hold winding 23, and that the other end of hold winding 23 connects in common to one plate of capacitor 26 and to one end of output winding 24. The other end of output winding 24 connects in common to one terminal of diode 28 and to one end of trigger winding 25. The other terminal of diode 28 connects in common to one plate of discharge capacitor 16 and to main electrode 18 of flash tube 17. Collector 14 connects in common to the negative terminal of battery 10, to the other plate of discharge capacitor 16, and to main electrode 19 of flash tube 17. The other end of trigger winding 25 connects to common plate 30 of trigger capacitors 29 which connect to trigger electrodes 20 of flash tube 17, as illustrated. If desired, trigger capacitors 29 may be deleted and the other end of trigger winding 25 connected directly to trigger electrodes 20 of flash tube 17. Those skilled in the art may substitute an NPN transistor for PNP transistor 12 merey by reversing the polarity of battery 10. Also, it will be apparent that a triggered spark gap, or other triggered discharge device, may be substituted for flash tube 17.

The operation of the circuit illustrated in FIGURE 1 is believed to be as described below. However, I do not wish to be limited by this description, preferring to be limited by the appended claims. When switch 11 is closed, current starts to flow from the positive terminal of battery 10, through input winding 22 of autotransformer 21, through the emitter 13—collector 14 junction, back to the negative terminal of battery 10. When current starts to flow in input winding 22, the voltage induced in hold winding 23 forward biases the emitter 13—base 15 junction. Note that battery 10 reverse biases the collector 14—base 15 junction. As soon as current starts to flow from base 15 to emitter 13, the current flowing through input winding 22 and the emitter 13—collector 14 loop increases. The increasing current in winding 22 induces an increasing forward biasing voltage in hold winding 23 which causes the emitter 13—collector 14 current to further increase. This process continues until transistor 12 saturates and the emitter 13—collector 14 current no longer increases. At some instant when this current ceases to increase, the voltage induced in hold winding 23 drops to zero and the voltage on capacitor 26 reverse biases the emitter 13—base 15 junction. Regeneration starts. Emitter 13—collector 14 current starts to decreases; this induces a reverse biasing voltage in hold winding 23; the emitter 13—collector 14 current rapidly drops to zero; and current no longer flows through input winding 22. When transistor 12 cuts off, the energy stored in the various flux linkages of autotransformer 21 immediately induces voltages in windings 24 and 25. The current induced in output winding 24 flows through diode 28 to charge capacitor 16. This first charge appears on capacitor 16 as voltage step $52_1$, as illustrated in FIGURE 3A. Simultaneously, the voltage pulse $55_1$ (see FIGURE 3B) induced in trigger winding 25 is applied through trigger capacitors 29 to trigger electrodes 20 of flash tube 17. At this point in time, trigger voltages $55_1$ ionizes insufficient gas in flash tube 17 for discharge capacitor 16 to discharge therethrough.

The cycle then repeats, charging discharge capacitor 16 to voltage $52_2$ and simultaneously inducing trigger voltage pulse $55_2$. Again trigger pulse $55_2$ ionizes insufficient gas in flash tube 17 for discharge capacitor 16 to discharge therethrough.

The cycle continues to repeat, charging discharge capacitor 16 sequentially in steps to voltages $52_3$, $52_4$, $52_5$, . . . $52_N$ and simultaneously inducing sequentially trigger voltage pulses $55_3$, $55_4$, $55_5$ . . . $55_N$, respectively. Finally, a trigger voltage pulse, $55_N$, ionizes sufficient gas in flash tube 17 for its corresponding capacitor 16 voltage, $52_N$, to discharge therethrough, thereupon producing a brilliant flash of light in the manner disclosed in United States Letters Patent No. 2,977,508 issued on March 28, 1961 to K. J. Germeshausen.

After flash tube 17 fires, the gas therein deionizes, and the above-described process repeats itself. It will be apparent that component values and environmental conditions govern the number of capacitor 16 voltage charging steps, 52, which in turn govern the flash tube 17 flashing rate.

A safety light for use at sea utilizes the circuit illustrated in FIGURE 1. The circuit obviously has many other applications, this one being set forth by way of example only. In the foregoing safety light, component values are as follows:

Battery 10—4½ volts—3 "D" Cells in series
Switch 11—Single Pole-Single Throw Mercury Switch
Autotransformer 21—Stancor A2447 Flyback Autotransformer
PNP Transistor 12—Minneapolis-Honeywell Type CA2D2
Capacitor 26—0.04 microfarad
Resistor 27—330 ohms.
Diode 28—600 peak inverse voltage, ¾ amp.
Discharge Capacitor 16—1 microfarad, 600 volt
Flash tube 17—FX-6A (disclosed in U.S. Letters Patent No. 2,977,508)
Trigger Capacitors 29—these are formed by inserting an insulating sleeve between the pins (which are connected to the trigger electrodes at the base of flash tube 17) and a metallic sleeve.

In operation, the above safety light circuit had a flashing rate of six (6) flashes per second. Capacitor 16 charged to 450 volts and trigger voltage pulses 55 increased to 2200 volts, both in about twenty (20) steps, at which time flash tube 17 (the FX-6A above) fired. In laboratory tests of this circuit I have observed voltage steps 52 and trigger voltage pulses 55.

The circuit illustrated in FIGURE 1 may be modified to accommodate a flyback transformer 31 (see FIGURE 2) instead of autotransformer 21. Note that in FIGURE 2 like circuit components have like reference characters. The negative terminal of battery 10 connects through switch 11 to one end of input winding 32 of flyback transformer 31, all windings of which are disposed in inductive relationship thereto. The other end of input winding 32 connects to collector 14 of transistor 12. Emitter 13 connects in common to the positive terminal of battery 10 and to one end of hold winding 33. The parallel combination of resistor 27 and capacitor 26 is connected between the other end of hold winding 33 and base 15 of transistor 12.

One end of output winding 34 connects to one terminal of diode 28. The other terminal of diode 28 connects in common to one plate of discharge capacitor 16, and to main electrode 45 of flash tube 44. Note that in this embodiment a different flash tube 44 is used. It has only one trigger electrode 46. The other end of output winding 34 connects in common to the other plate of capacitor 16, to main electrode 47 of flash tube 44, and to one end of trigger winding 35. The other end of trigger winding 35 connects to trigger electrode 46 of flash tube 44.

Figure 2:
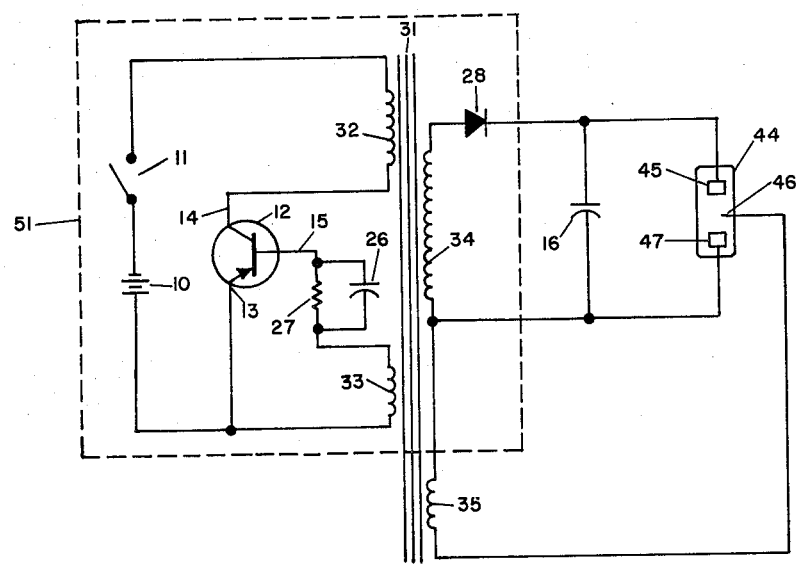
FIGURE 2 illustrates a modification of the circuit of FIGURE 1.

The operation of the circuit in FIGURE 2 is very much similar to that of FIGURE 1. When switch 11 is closed, current starts to flow through the emitter 13—collector 14 junction, through input winding 32 of flyback transformer 31, back to the negative terminal of battery 10. When current starts to flow in winding 32, the voltage induced in hold winding 33 forward biases the emitter 13—base 15 in junction. Note that battery 10 reverse biases the collector 14—base 15 junction. As soon as current starts to flow from base 15 to emitter 13, the current flowing through the emitter 13—collector 14 junction and input winding 32 increases. The increasing current in winding 32 induces an increasing forward biasing voltage in hold winding 33 which causes the emitter 13—collector 14 current to increase. This process continues until transistor 12 saturates and the emitter 13—collector 14 current no longer increases. At some instant when this current ceases to increase the voltage induced in hold winding 33 drops to zero, and the voltage on capacitor 26 reverse biases the emitter 13—base 15 junction. Regeneration starts. Emitter 13—collector 14 current starts to decrease; this induces a reverse biasing voltage in hold winding 33; the emitter 13—collector 14 current rapidly drops to zero; and current no longer flows through input winding 32. When transistor 12 cuts off, the energy stored in the various flux linkages of flyback transformer 31 immediately induces voltages in windings 34 and 35. The current induced in output winding 34 flows through diode 28 to charge capacitor 16. This first charge appears on capacitor 16 as voltage step $52_1$, as illustrated in FIGURE 3A. Simultaneously, the voltage pulse $55_1$ (see FIGURE 3B) induced in trigger winding 35 is applied across main electrode 47 and trigger electrode 46 of flash tube 44. The subsequent operation of the circuit is similar to that of FIGURE 1 as explained hereinabove.

It will be obvious that the invention achieves the objects stated; that is, the number of circuit component parts has been drastically reduced over the number in prior art self-timing electron flash circuits. In addition, the invention eliminates any need for inverter circuit regulation; although it is to be understood that regulated flyback inverter circuits may be used with the invention. Consequently, circuit reliability has been vastly improved. Moreover, with these results, the further result obtains that, with presently available components and enscapulation techniques, the system is very rugged in construction, light in weight may be made portable, self-contained, easily operable, and thoroughly effective and reliable in operation.

It will be understood that various changes in the details, materials, steps, and arrangements of parts, which have been herein described and illustrated in order to explain the nature of the invention, may be made by those skilled in the art within the principle and scope of the invention as expressed in the appended claims.

I claim:
1. A self-timing electric discharge circuit comprising:
 (a) a discharge capacitor having two terminals;
 (b) a flyback inverter circuit including a magnetic core member having input, hold, and output windings and the additional improvement of a single trigger winding, all disposed in inductive relationship thereto, with said output winding connected through a diode device to the terminals of said discharge capacitor, said inverter circuit being adapted, when energized, to charge said discharge capacitor in increasing voltage steps and simultaneously to induce in said trigger winding correspondingly increasing voltage potentials;
 (c) a gaseous discharge device having two main electrodes and a trigger electrode; and
 (d) circuit means connecting said discharge capacitor to the main electrodes of said discharge device and said trigger winding to said trigger electrode and directly to a main electrode of said discharge device, such that, as said capacitor voltage increases in steps, a correspondingly increasing trigger voltage potential is developed which said circuit means applies directly across said trigger electrode and said main electrode and which eventually ionizes sufficient gas between said trigger electrode and said main electrode for its corresponding capacitor voltage to discharge between said main electrodes.

2. A self-timing electric discharge circuit as in claim 1 in which said gaseous discharge device comprises a flash tube.

3. A self-timing electric discharge circuit as in claim 2 in which said flash tube has a plurality of trigger electrodes disposed at successive intervals in the space and direction between its main electrodes.

4. A self-timing electric discharge circuit as in claim 1 in which said flyback inverter circuit has a magnetic core member comprising a flyback autotransformer.

5. A self-timing electric discharge circuit as in claim 1 in which said flyback inverter circuit has a magnetic core member comprising a flyback transformer.

6. A self-timing electric discharge circuit as in claim 1 in which said gaseous discharge device comprises a triggered spark gap.

References Cited by the Examiner
UNITED STATES PATENTS

| 2,014,957 | 9/1935 | Westendorp | 315—241 |
| 2,982,881 | 5/1961 | Reich | 315—219 X |
| 3,024,386 | 3/1962 | Chauvineau | 315—241 X |

JAMES D. KALLAM, *Acting Primary Examiner.*

BENNETT G. MILLER, *Examiner.*

L. ZALMAN, *Assistant Examiner.*